(12) United States Patent
Wilkes et al.

(10) Patent No.: US 9,645,955 B1
(45) Date of Patent: May 9, 2017

(54) DISRUPTION COUNTERS

(71) Applicant: Google Inc., Mountain View, CA (US)

(72) Inventors: John Wilkes, Palo Alto, CA (US); Brian Grant, San Carlos, CA (US); Luc Mercier, Zurich (CH); Todd Pu-Tse Wang, Saratoga, CA (US)

(73) Assignee: Google Inc., Mountain View, CA (US)

( * ) Notice: Subject to any disclaimer, the term of this patent is extended or adjusted under 35 U.S.C. 154(b) by 573 days.

(21) Appl. No.: 14/183,704

(22) Filed: Feb. 19, 2014

(51) Int. Cl.
*G06F 13/24* (2006.01)
*G06F 13/26* (2006.01)
*G06F 9/48* (2006.01)

(52) U.S. Cl.
CPC .............. *G06F 13/24* (2013.01); *G06F 13/26* (2013.01); *G06F 9/4812* (2013.01)

(58) Field of Classification Search
CPC ...... G06F 3/1213; G06F 3/1263; G06F 13/24; G06F 13/26; G06F 9/4812; H04N 1/00204; H04N 1/00954; H04N 1/00923
See application file for complete search history.

(56) References Cited

U.S. PATENT DOCUMENTS

| 8,554,458 | B2 | 10/2013 | Sawhill et al. | |
|---|---|---|---|---|
| 2007/0028014 | A1* | 2/2007 | Hayashi | G06F 3/0613 710/38 |
| 2009/0006574 | A1 | 1/2009 | Horvitz et al. | |
| 2011/0032565 | A1* | 2/2011 | Akimoto | G06F 3/1213 358/1.15 |

* cited by examiner

*Primary Examiner* — Ernest Unelus
(74) *Attorney, Agent, or Firm* — Lerner, David, Littenberg, Krumholz & Mentlik, LLP

(57) ABSTRACT

A system is provided that includes a memory and one or more processors in communication with the memory. The one or more processors are configured to identify a set of targets and select a first value corresponding to a number of targets from the set of targets that can be concurrently disrupted. A second value is determined that is related to a number of disruptions actually occurring. A disruption request is received for a target of the set of targets. Thereafter, the first value is compared to the second value. Based on the comparison of the first and second values, it is determined whether to resist a requested disruption. If it is determined that the disruption is to be resisted, the requested disruption is resisted. If it is determined that the disruption is not to be resisted, at least one of the first value and the second value are adjusted.

16 Claims, 8 Drawing Sheets

DISRUPTION COUNTERS

BACKGROUND

A cluster refers to a group of computing machines. For example, FIG. 1 illustrates a system 100 with a cluster 110 that includes a plurality of server racks 120. Each server rack 120 further includes a plurality of machines or servers 130. For example, one rack 120 may hold approximately 40-80 machines 130. The cluster 110 may therefore include thousands, tens of thousands, or more machines 130. A cluster switch 115 may be used for communication among machines 130 in the cluster 110. According to some examples, the cluster switch 115 may be a set of switches.

Clusters support jobs composed of many tasks. These jobs may have requirements, such as system resources, e.g., how much processing capabilities, memory, etc., is or should be used to perform the job or task, and system constraints, e.g., data objects, machine types or pool of machines, software to run, preferences, etc. Job schedulers can schedule the jobs onto one or more clusters that may include many computing machines.

Typically, jobs can be disrupted (e.g., stopped, evicted, halted, etc.) either deliberately or as a result of unplanned events and failures. Different job schedulers may also compete for resources, which can disrupt another scheduler's jobs, for example, by preempting other tasks to make space for their own. However, when many of these job disruptions occur simultaneously, it can affect an overall predictability of a system.

BRIEF SUMMARY

Aspects of the present disclosure may be advantageous for providing techniques to protect a set of system targets, such as jobs, tasks, machines, etc., from various scheduled and unscheduled disruptions. This may allow a system to achieve some objective and/or service level agreement. In one aspect, a method is provided. The method includes identifying a set of targets and selecting a first value corresponding to a number of targets from the set of targets that can be concurrently disrupted. A second value is determined that is related to a number of disruptions actually occurring. A disruption request is received for a target of the set of targets. Thereafter, the first value is compared to the second value. Based on the comparison of the first and second values, it is determined whether to resist a requested disruption. If it is determined that the disruption is to be resisted, the requested disruption is resisted. If it is determined that the disruption is not to be resisted, at least one of the first value and the second value are adjusted.

In another aspect, a non-transitory computer readable medium is provided. The non-transitory computer storing instructions that, when executed by one or more processors, cause the one or more processors to perform a method. The method includes identifying a set of targets and selecting a first value corresponding to a number of targets from the set of targets that can be concurrently disrupted. A second value is determined that is related to a number of disruptions actually occurring. A disruption request is received for a target of the set of targets. Thereafter, the first value is compared to the second value. Based on the comparison of the first and second values, it is determined whether to resist a requested disruption. If it is determined that the disruption is to be resisted, the requested disruption is resisted. If it is determined that the disruption is not to be resisted, at least one of the first value and the second value are adjusted.

In yet another aspect, a system is provided. The system includes a memory and one or more processors in communication with the memory. The one or more processors are configured to identify a set of targets and select a first value corresponding to a number of targets from the set of targets that can be concurrently disrupted. A second value is determined that is related to a number of disruptions actually occurring. A disruption request is received for a target of the set of targets. Thereafter, the first value is compared to the second value. Based on the comparison of the first and second values, it is determined whether to resist a requested disruption. If it is determined that the disruption is to be resisted, the requested disruption is resisted. If it is determined that the disruption is not to be resisted, at least one of the first value and the second value are adjusted.

DETAILED DESCRIPTION

Figure 1:
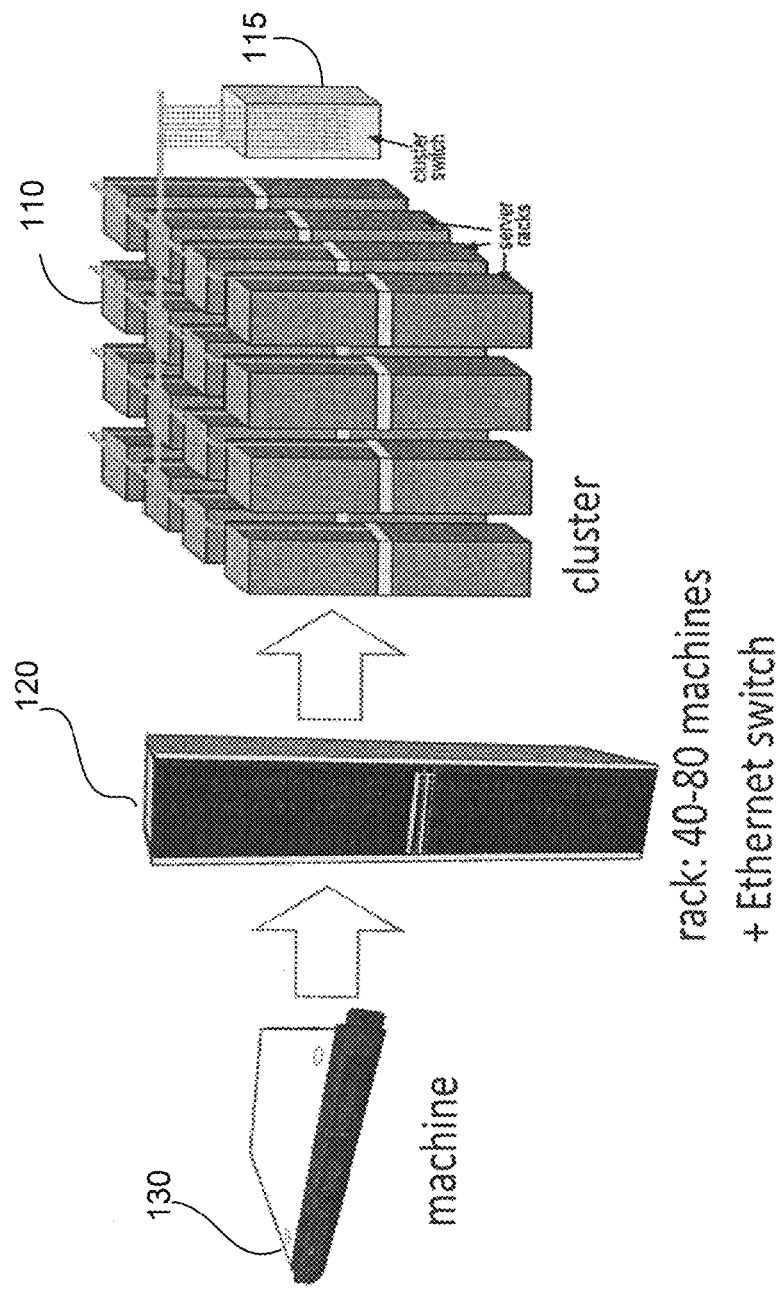
FIG. 1 depicts a pictorial diagram of a system with a computing cluster.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

The present disclosure generally relates to providing techniques to protect a set of system targets from various scheduled and unscheduled disruptions. A target can be some type of system resource to be protected from certain disruptions. For example, this can be a "consumer" (e.g., jobs, tasks or data objects), a claim, a resource pool, such as a cluster of machines, or any computing device. Some targets can be outside of the system resource model, such as a service associated with the system.

The techniques described herein may allow a system to achieve certain objectives, such as preventing the number of concurrent controllable disruptions that can occur on the system. Each system target has an effective precedence value that may indicate a cost associated with disrupting that target or the relative undesirability of a disruption. The effective precedence is the precedence that a target achieves when it is being protected by a disruption counter that has reached its permitted-concurrent-outages limit, for the purpose of determining whether the target may be disrupted. Numerically, it may be equal to the protection precedence.

A disruption counter is used to keep track of a number of concurrent disruptions in the set of targets. For example, the disruption counter may be initialized to a positive value that indicates a maximum number of targets from the set that can be concurrently disrupted. There can be several different kinds of disruptions that can occur, such as stopping a task, scheduling a machine reboot, changing a flag value, transitioning a target from its normal state, etc.

Each potential disruption and disruption counter has an associated precedence value. Each time there is a disruption of a target that the disruption counter is protecting, the disruption counter is decremented, for example, by a count of one. If the disruption counter is about to meet a value less than zero, then it resists any more disruptions that make things worse. Disruptions that do not alter the counter are permitted. However, some disruptions are unstoppable events that cannot be resisted, such as a hardware fault. In these instances, the disruptions have an infinite precedence value associated with them. When the disruption of the target ends, the disruption counter is incremented.

If the disruption counter goes to a negative number, then the disruption counter may "bump up" or otherwise increase the effective precedence values of the remaining undisrupted targets from the set of system targets. For example, the effective precedence values of the undisrupted targets may be increased to correspond with a protection precedence value of the disruption counter. This effectively protects the remaining targets from being disrupted by disruptions with a lower precedence value. If the disruption counter subsequently becomes positive, then the effective precedence value of the remaining undisrupted targets are reverted back to their usual value.

Example System

Figure 2:
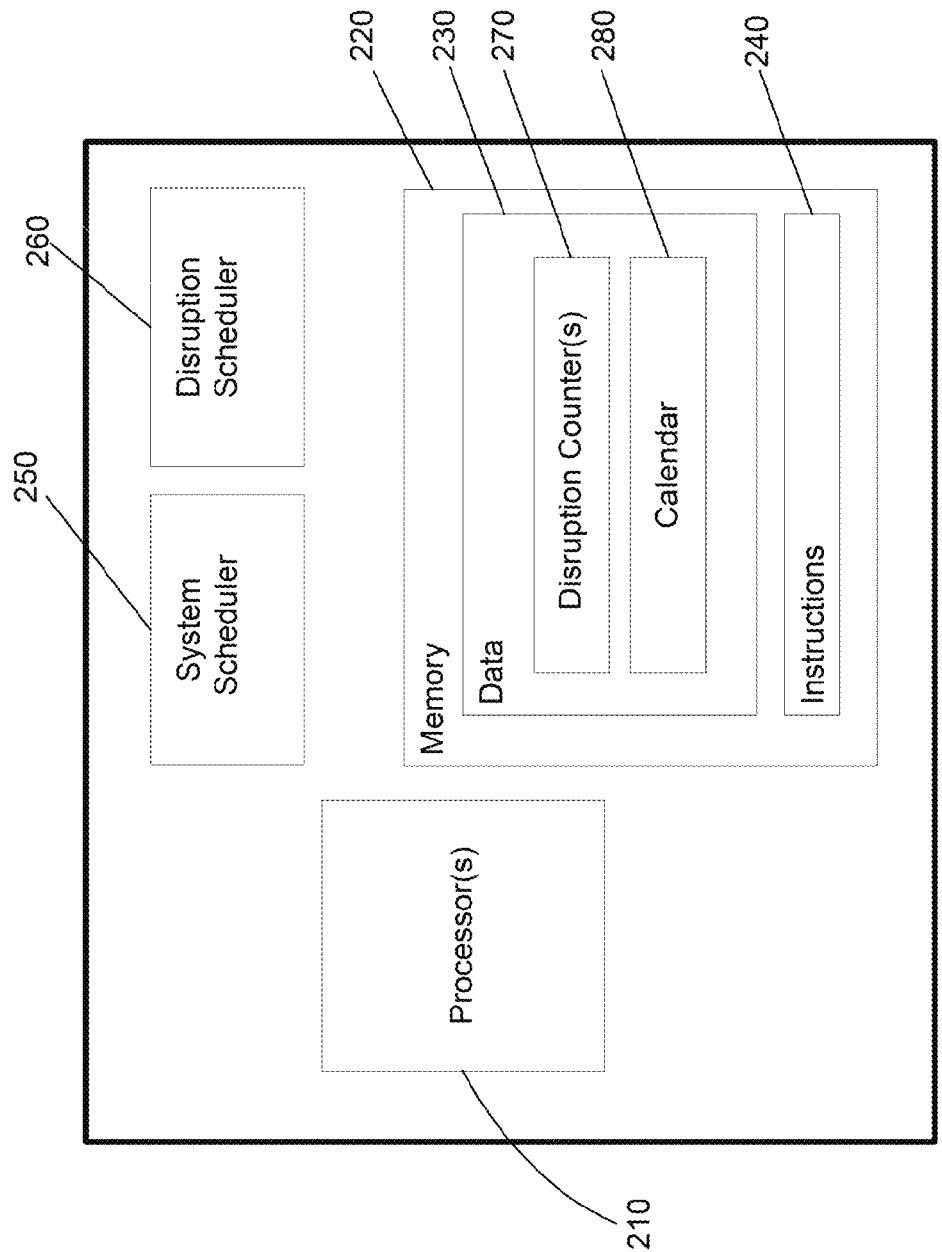
FIG. 2 depicts a block diagram of a system according to aspects of the disclosure.

FIG. 2 depicts an example system 200, which may include the disruption counter as described above. This example should not be considered as limiting the scope of the disclosure or usefulness of the features described herein. As shown, the system 200 includes one or more processors 210 in communication with a memory 220.

The processors 210 may be conventional processors. Alternatively, the processors 210 may be dedicated controllers such as ASIC or other hardware-based processors. The processors 210 and memory 220 may actually comprise multiple processors and memories that may or may not be stored within the same physical housing. For example, memory 220 may be a hard drive or other storage media located in a server farm of a data center. Accordingly, references to a processor, memory, or computer will be understood to include references to a collection of processors, memories or computers that may or may not operate in parallel.

The memory 220 stores information accessible by processors 210, including instructions 240 that may be executed by the processors 220. Memory 220 also includes data 230 that may be retrieved, manipulated or stored by the processor, such as copies of previously downloaded content. The memory may be of any type capable of storing information accessible by the processor, such as solid state storage, a solid-state drive (SSD), a hard-drive, memory card, ROM, RAM, DVD, CD-ROM, write-capable, and read-only memories. The memory 220 may be of any type capable of storing information accessible by the processors 210, including a non-transitory computer-readable medium, or other medium that stores data that may be read with the aid of an electronic device, such as a hard-drive, memory card, ROM, RAM, DVD or other optical disks, as well as other write-capable and read-only memories. The memory 220 can be local or remote, private or shared. Systems and methods may include different combinations of the foregoing, whereby different portions of the instructions 240 and data 230 are stored on different types of media.

Although FIG. 2 functionally illustrates the processors 210 and memory 220 as being within the same block, the processors 210 and memory 220 may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processors 210. Similarly, the processors 210 may actually comprise a collection of processors which may or may not operate in parallel.

The instructions 240 may be any set of instructions to be executed directly (such as machine code) or indirectly (such as scripts and bytecode) by the processor 210. The instructions may be stored in object code format for direct processing by the processor, or in any other computer language including scripts or collections of independent source code modules that are interpreted on demand or compiled in advance or a mix thereof. Functions, methods and routines of the instructions are explained in more detail below.

Data 230 may be retrieved, stored or modified by the processors 210 in accordance with the instructions 240. For instance, although the techniques described herein are not limited by a particular data structure, the data 230 may be stored in computer registers, in a relational database as a table having a plurality of different fields and records, or XML documents. The data 230 may also be formatted in any computer-readable format such as, but not limited to, binary values, ASCII or Unicode. Moreover, the data 230 may comprise information sufficient to identify the relevant information, such as numbers, descriptive text, proprietary codes, pointers, references to data stored in other memories (including other network locations) or information that is used by a function to calculate the relevant data.

According to the example of FIG. 2, system 200 may include multiple schedulers. Each scheduler may include or be in communication with the processors 210 and may perform a different scheduling function. As shown in FIG. 2, system 200 includes one or more system schedulers 250 and one or more disruption schedulers 260. The system and disruption schedulers 250, 260 may access information regarding targets scheduled to execute on or use any machine in a cluster. For example, each scheduler may see targets scheduled on any machine in the cluster, and may also be capable of scheduling additional events for any machine in the cluster. In that regard, the system 200 may store a calendar 280 accessible by the schedulers. The calendar 280 may include a schedule for targets and disruptions over any period of time, such as minutes, hours, days, weeks, months, etc. Similarly, such time periods may be broken down in any increments. For example, some targets and disruptions may be scheduled in seconds, microseconds, etc.

A cluster can have many planned and unplanned events that are disruptive to targets running on the cluster, such as hardware outages, operating systems upgrades, and firmware upgrades, etc. During such disruptions, targets may typically be in some type of non-functional state. While a scheduler associated with the cluster may eventually fix problems caused by the disruption, the cluster may suffer degraded performance until this occurs. Moreover, when many of these disruptions occur concurrently, the system 200 can be negatively impacted.

In order to facilitate operations for controlling the number of concurrent disruptions of targets that satisfies a certain objective (e.g., a service level agreement), system 200 may further store one or more disruption counters 270. Although the disruption counters 270 are identified as a discrete module in connection with FIG. 2, the functionality of the counters may overlap and/or exist in a fewer or greater number of modules than what is shown, with such modules residing at one or more computing machines, which may be dispersed.

Each disruption counter is a counting mutex in that the counters can be shared and accessed by multiple resources of system 200 including other disruption counters. For example, multiple schedulers can share the same disruption counter. The disruption counters 270 are used to protect a set of system targets associated with system 200 from disruptions. For example, a counter value for a given disruption counter is initialized to a number indicating a total number of disruptions permitted in the set that the counter protects. The counter value is decremented when a protected target from the set is disrupted, whether by a planned or unplanned disruption. The counter value is incremented when the protected target recovers. Further aspects of the disruption counters 270 are discussed below with respect to FIG. 3.

Figure 3:
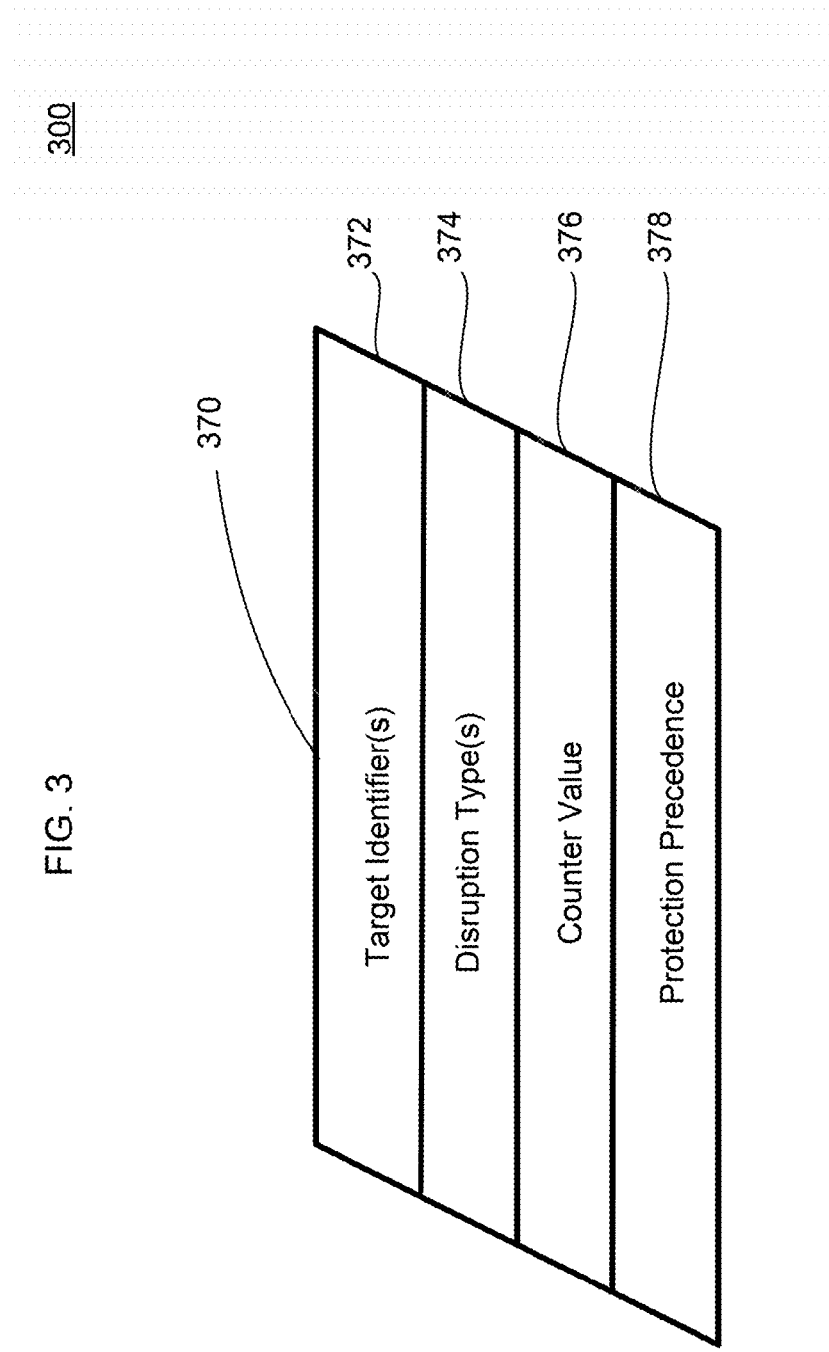
FIG. 3 depicts a block diagram of a disruption counter according to aspects of the disclosure.

In FIG. 3, a block diagram 300 of a disruption counter 370 is shown. In this example, details as to the types of information contained in the disruption counters are described. For example, the disruption counter 370 may include one or more target identifiers 372 for identifying a set of protected targets, a number of different disruption definition types 374, a counter value 376 indicating how many disruptions are permitted before a goal is missed, and a protection precedence 378. The protection precedence 378 is, for example, a priority value assigned to the disruption counter. Once protection has been provided to the targets by a disruption counter, only certain disruptions with a higher precedence can override that protection.

Target identifiers 372 for the set of protected targets can be identified in many different ways. For example, they can be identified by an explicit name of the target or a name of some other of reference pointer "linked" to the target or they can be identified by an intermediate object, such as a table of targets, or the targets can identify the disruption counters that protect them, or any other way of linking the two.

Targets in the set of protected targets can be, e.g., jobs, tasks, programs, claims, data objects, resource pools, computing machines and any other system service or resource. Targets can also be some end point whose completion is depended upon to ensure that a goal is met. For example, running jobs can have dependent tasks be targets in order to project the task from disruptions, or the claims or pools that provide resources to those tasks can be protected targets, thereby implicitly helping to protect the task that relies on them.

In another example, if the targets are machines or racks of machines then tasks could be spread across them. This would help protect the tasks that depend upon these machines against, for example, planned disruptions of certain racks and certain power systems in various higher-level power structures, such as bus ducts.

In some situations, it may be useful to have just one target in the set of protected targets, e.g., to be able to provide statistics on the number of disruptions for an individual task. If a target no longer needs protection, it should be removed from the set of protected targets. For example, if a task is migrated from an old machine to a new machine by creating a new copy of the task at the new machine and killing the task at the old machine, then the old task should be removed from the set of protected targets, before it is killed.

The disruption counter 370 can include information to define several different kinds of disruption types 374, and the counter protects against each of these independently. For example, one of the disruption types 374 can be when a target transitions from a "functional" to "non-functional" state in some way. For example, a non-functional state can be when a consumer (e.g., task) is stopped (killed, evicted, preempted), a claim or pool is suspended, such as when a higher-precedence claim is scheduled instead, or an attribute is changed in an incompatible way, or when a machine is taken offline, e.g., to be rebooted, for repairs, or permanently, or other types of disruptions.

A preemption notice represents a period of time a task is given to clean up and exit. If the task is killed before this time passes, then the preemption notice has been missed. In some aspects, this can be defined as a kind of disruption that can be resisted by a disruption counter. Such a disruption counter would typically have a protection precedence 378 that is higher than the one that resists killing the tasks. Operations related to the protection precedence 378 of the discretion counter 370 are discussed in more detail below.

In some aspects, the disruptions can be predicted or planned (e.g., anticipated, calendared or scheduled) or unplanned. For example, disruptions can be calendared for a time in the future or observed to have happened in the past. If the disruptions are calendared then the disruption counter 370 may be calendared too, which means that the counter value 376 in the disruption counter is recorded as having different values at different times—especially when those times are in the future. An example of this is when there is a disruptive set of events, such as rolling out a new OS kernel to a fleet of machines, which requires them to be rebooted. On this fleet, there may be a job with, for example, 100 replica tasks where performance is only acceptable when at least 95 of the tasks are up. If a disruption counter with an initial value of 3 protects these 100 tasks, the scheduler in charge of the rollout, which has access to this information, will try not to schedule upgrades in a way that disrupts more than 3 protected tasks at the same time.

To keep track of the number of targets in the set of protected targets that are concurrently disrupted, the disruption counter 370 includes a counter value 376. The counter value 376 is typically initialized to a positive value that indicates how many disruptions are permitted before a goal will be missed (e.g., the maximum permitted number of concurrent disruptions). Once the counter value 376 gets to a certain number (e.g., zero), no more disruptions of the target are permitted. For example, if the value of the counter reaches the certain number, the next disruption would cause a goal to be missed.

A proposed disruption is not permitted if it would cause a disruption to a higher- or equal-precedence target anywhere in the system. For example, something that might cause a disruption on the system has an associated precedence value, which identifies the precedence used to determine if it permitted to cause a disruption of a target. Some disruptions, such as a system fault, effectively have an infinite precedence associated with them, because they are unstoppable.

Each target has a default effective precedence that is its normal value. A target can only be disrupted by an entity that has and equal or higher precedence. Each target may also have a weight that specifies how much the disruption counter 370 is changed by disrupting or restoring that target. This permits some targets to be more valuable, and makes it possible to generate metrics that represent the available processing capacity in a system, e.g., by making the target weights equal to how many queries per second that target can handle.

Because a disruption counter is also a target, it can be disrupted. For example, the disruption counter is disrupted if its counter value goes negative. For this reason, it is possible to construct a tree of nested disruption counters to represent some goal, such as no more than 5 tasks down in a rack, and no more than 3 racks down at a time, or no more than 2 tasks per shards down, and no more than 3 shards down.

When acting as a target, the disruption counter 370 has an effective precedence of its own which indicates how much it resists being disrupted. The normal precedence of the disruption counter 370 may be set to be the same as the protection precedence 378. The effective precedence of the disruption counter 370 may be provided by another disruption counter, such as one further up the tree. Such an effective precedence can be higher than the protection precedence of the disruption counter 370, and so can be used to increase the resistance to disruptions of the counter. The effective precedence of the disruption counter 370 may be propagated as the effective precedence of the targets protected by the counter 370 if it is larger than the protection precedence 378.

Figure 4:
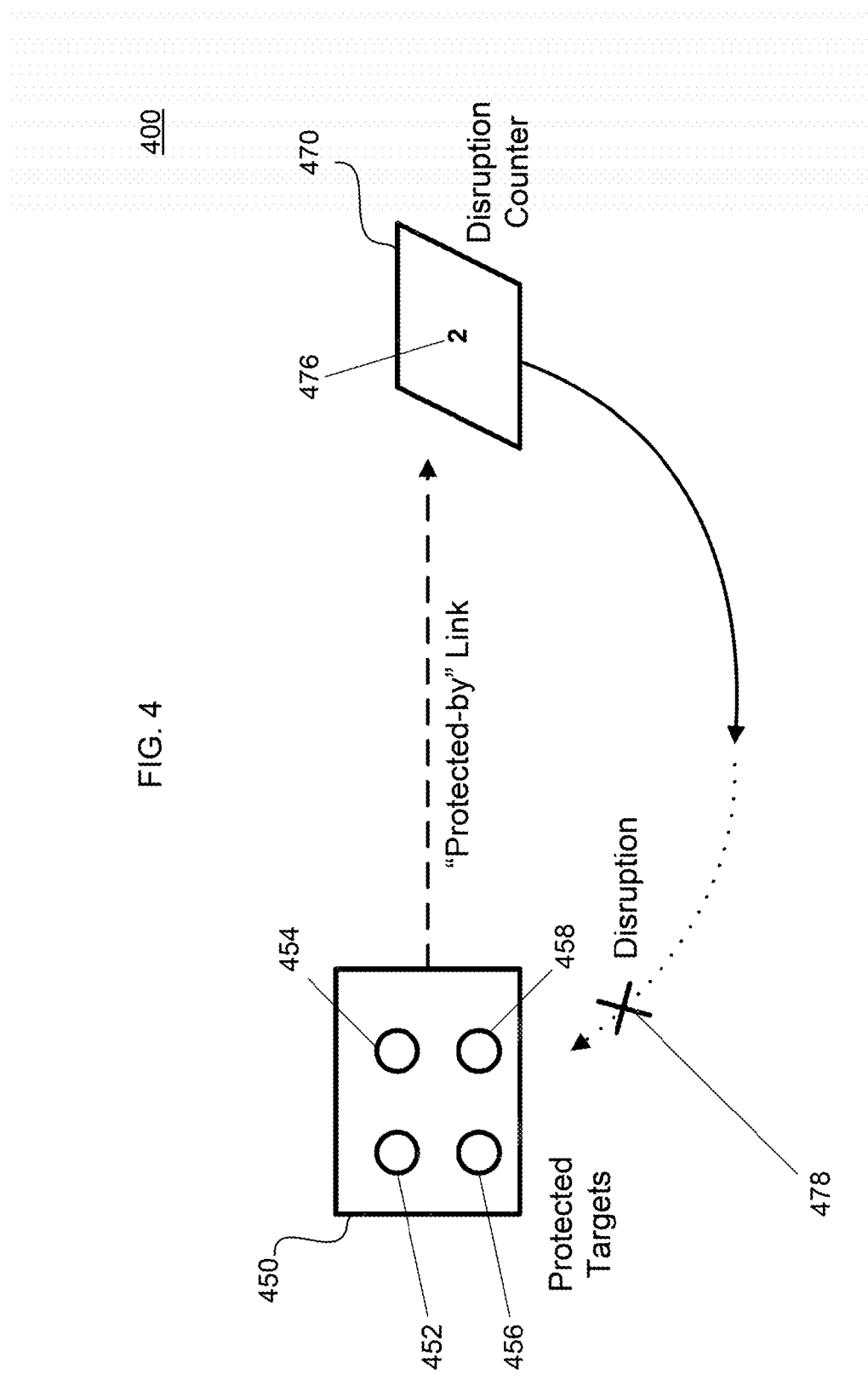
FIG. 4 depicts an example of a system including a disruption counter according to aspects of the disclosure.

FIG. 4 is an example of a system 400 including a disruption counter 470. In this example, the disruption counter 470 is configured to protect a set of targets 450 from certain disruptions. As shown, the set of targets 450 includes four targets 452-458. Each target can be a job, task, computing machine or other types of system services or resources. These targets each have a default effective precedence and can only be disrupted by some entity that has an equal or higher precedence.

As discussed above, the disruption counter 470 has a protection precedence indicating a precedence value for disruption counter 470. The disruption counter 470 includes a counter value 476 to keep track of the number of target concurrently disrupted in the set of protected targets 450. For example, the counter value 476 is typically set to a positive number, here 2, indicating the total number of targets that can be concurrently disrupted.

When there is a disruption 478 scheduled for a particular target, the counter value 476 is decremented a predetermined amount, e.g., by one unit. In that regard, the disruption counter 470 needs to determine if the disruption is permitted in order to allow the disruption of the particular protected target. The disruption counter 470 typically has no effect while its counter value 476 is positive. However, once the counter value 476 goes negative, the disruption counter 470 increases the effective precedence of any remaining undisrupted targets in order to protect them from further disruptions.

Figure 5:
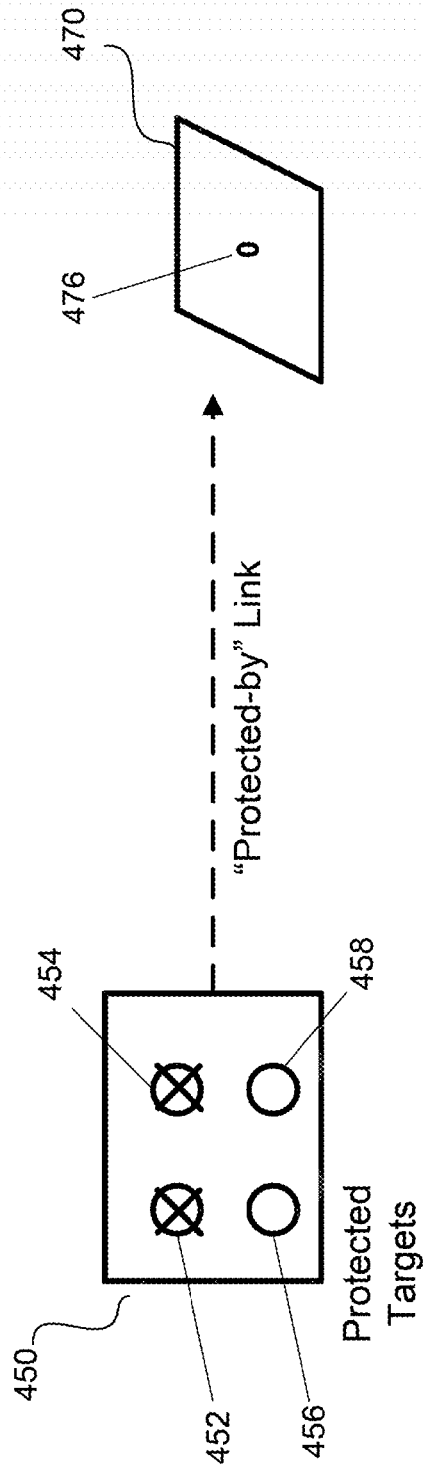
FIG. 5 depicts another example of the system the disruption counter of FIG. 4 according to aspects of the disclosure.

In FIG. 5, another example of the system 400 including the disruption counter 470 of FIG. 4 is shown. Here, two targets 452 and 454 from the protected targets 450 are disrupted. As shown, the counter value 476 of the disruption counter 470 has reached zero. For example, this may indicate that the counter value 476 has been decremented by two units where each unit represents a disruption for a particular target.

The effective precedence of the undisrupted targets 456, 458 is not increased in response to the counter value 476 reaching zero. For example, this might cause undesirable side effects like suppressing other targets. Instead, the disruption counter 470 resists further disruptions so that its counter value 476 does not go negative. If counter value 476 does happen to go negative, then the effective precedence of the remaining undisrupted targets 456, 458 are effectively bumped up to ensure that they do not get disrupted. When the counter value 476 returns to zero, the effective precedence of the undisrupted protected targets 456, 458 are restored to their normal value.

Figure 6:
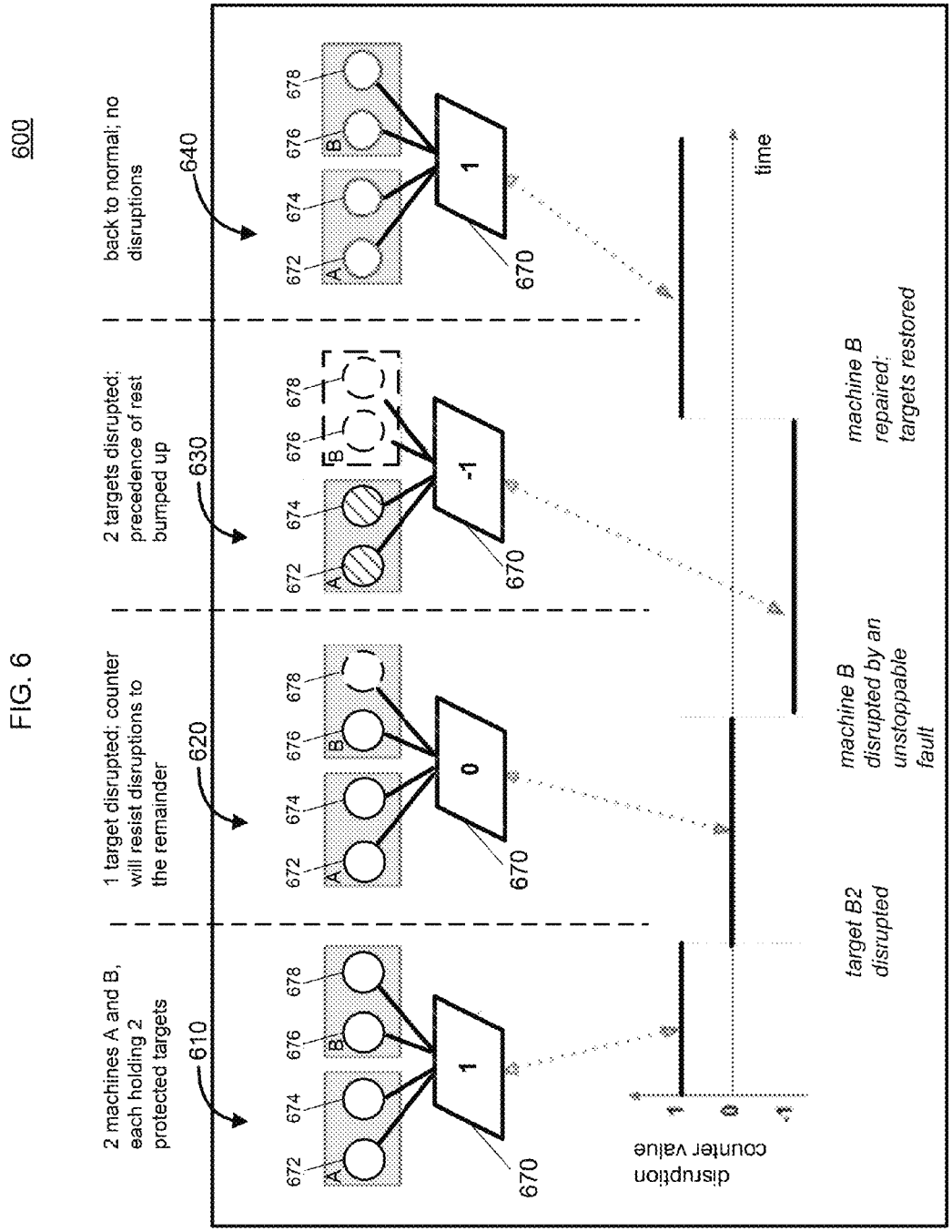
FIG. 6 depicts an example of a series of disruptions according to aspects of the disclosure.

FIG. 6 is an example 600 of a series of disruptions. As shown, disruption counter 670 protects targets 672-678 on machines A and B. The disruption counter 670 indicates the total number of disruptions permitted amongst these targets. For example, at point 610 in the example 600, the disruption counter 670 is initialized to one.

At point 620, a target is shown disrupted. For example, target 678 is disrupted by a disruption. At this point 620, the disruption counter 670 reaches zero. For example, disruption counter 670 is decremented by one unit that represents a cost for disrupting target 679. As discussed above, the effective precedence of the undisrupted targets 672, 674, 676 is not increased in response to the disruption counter 670 reaching zero. Instead, the disruption counter 670 resists further disruptions to the undisrupted targets 672, 674, 676 that it protects.

At point 630, machine B is disrupted by an unstoppable event, such as a system fault. As such, targets 676 and 678 are disrupted even though the disruption counter 670 is resisting further disruptions to those targets. As shown, the disruption counter 670 goes negative because it is decremented, for example, by one unit due to the disruption of targets 676 and 678. In response to going negative, the disruption counter 670 increases the effective precedence of the remaining undisrupted protected targets 672 and 674 to a function of their own precedence and the protection precedence of the disruption counter 670. This makes the undisrupted targets 672 and 674 harder to disrupt. For example, the effective precedence of undisrupted targets 672 and 674 are set to a maximum between the protection precedence of the disruption counter 670 and each target's own precedence. Because of this, the disruption counter 670 has no effect in stopping disruptions unless its protection precedence is higher than the normal effective precedence of the targets 672-678 it protects.

Disruption counters typically provide only one level of resistance to disruption. For example, as disruption counter 670 reaches zero, it may resist further disruptions to any undisrupted targets that can make to counter go negative. In some aspects, as the disruption counter 670 gets more negative, it can extend this resistance level by increasing its protection precedence. The more negative the disruption counter 670 gets, the worse things are, and the harder the system may try to restore the counter to a positive value. In some situations, the disruption counter 670 may reach a max-pain threshold. If the disruption counter 670 passes this threshold, it may no longer try to resist disruptions.

At point 640, machine B has been repaired and disrupted targets 676 and 678 are restored on machine B. As a result, the disruption counter 670 is incremented back to normal level of one unit. In some aspects, a rate limit on the number of disruptions that can occur during a certain time period may be implemented by requiring a predetermined amount of time to pass between a decrement to a disruption counter and its corresponding increment. This type of rate limit disruption counter is further described below with respect to FIG. 7.

Figure 7:
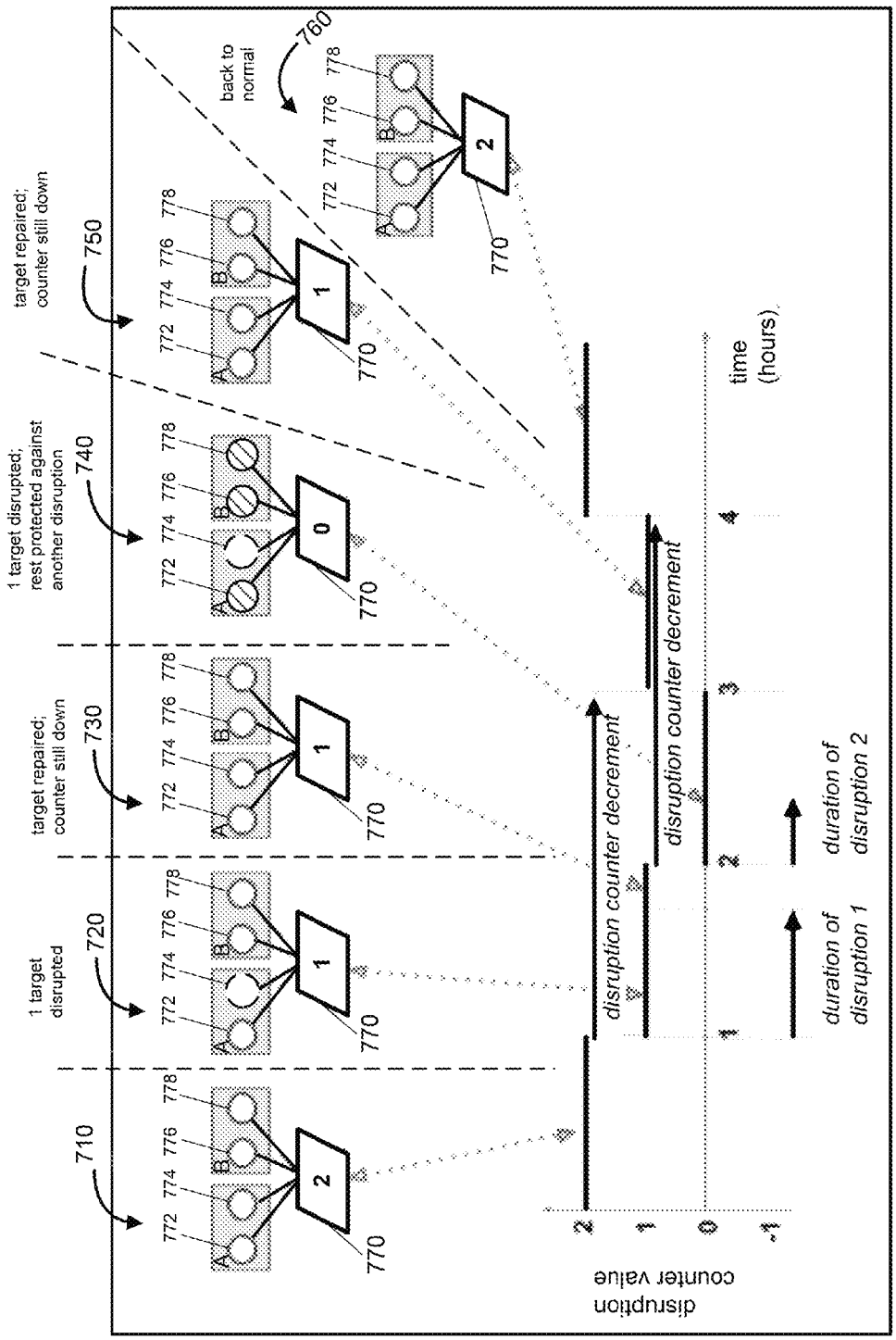
FIG. 7 depicts another example of a system including a disruption counter during a series of disruptions according to aspects of the disclosure.

FIG. 7 is another example 700 of a disruption counter 770 during a series of disruptions 710-760. In this example, the disruption counter 770 protects targets 772-778 on machines A and B. The disruption counter 770 includes information indicating a total number of disruptions permitted amongst these targets. For example, at point 710 in example 700, the disruption counter 770 is initialized to two units.

At point 720, some type of disruption disrupts target 774. Based on this disruption, the disruption counter 770 is decremented by one unit to a count of one.

At point 730, target 774 is repaired, but the disruption counter 770 is not incremented back to normal. For example, a predetermined time period is set for each disruption counter decrement. The predetermined time period indicates a minimum time that must pass before the disruption counter 770 can be incremented. For example, the predetermined time period here is set to two hours meaning that no more than 2 disruptions per every 2 hours are permitted.

During the first 2 hour time period, a second disruption occurs. As shown, at point 740 in the example, target 774 is disrupted again. Here, the disruption counter 770 is still at one, thus it is decremented by one unit to reach zero. This decrement of the disruption counter 770 may extend the time period since the disruption counter was decremented for a second 2 hour time period. Because the disruption counter 770 is at zero, it can resist further disruptions to the undisrupted targets 772, 776, 778 that may make the counter become negative.

At point 750, target 774 is repaired, but the disruption counter 770 is not incremented back to normal even though none of the protected targets 772-778 are disrupted. This is because the second 2 hour time period since the disruption counter 770 was decremented has not yet passed. As such, the disruption counter 770 is incremented by one unit to only account for the repaired target 774.

At point 760, the second 2 hour time period since the disruption counter 770 was decremented has passed. Therefore, the disruption counter 770 is incremented by one more unit back to its normal two units.

Techniques for protecting system targets, for example, using systems like system 200 that include disruption counters, will now be described. As noted above, the following operations do not have to be performed in the precise order described below. Rather, as mentioned above, various operations can be handled in a different order or simultaneously, and operations may be added or omitted.

Example Method

Figure 8:
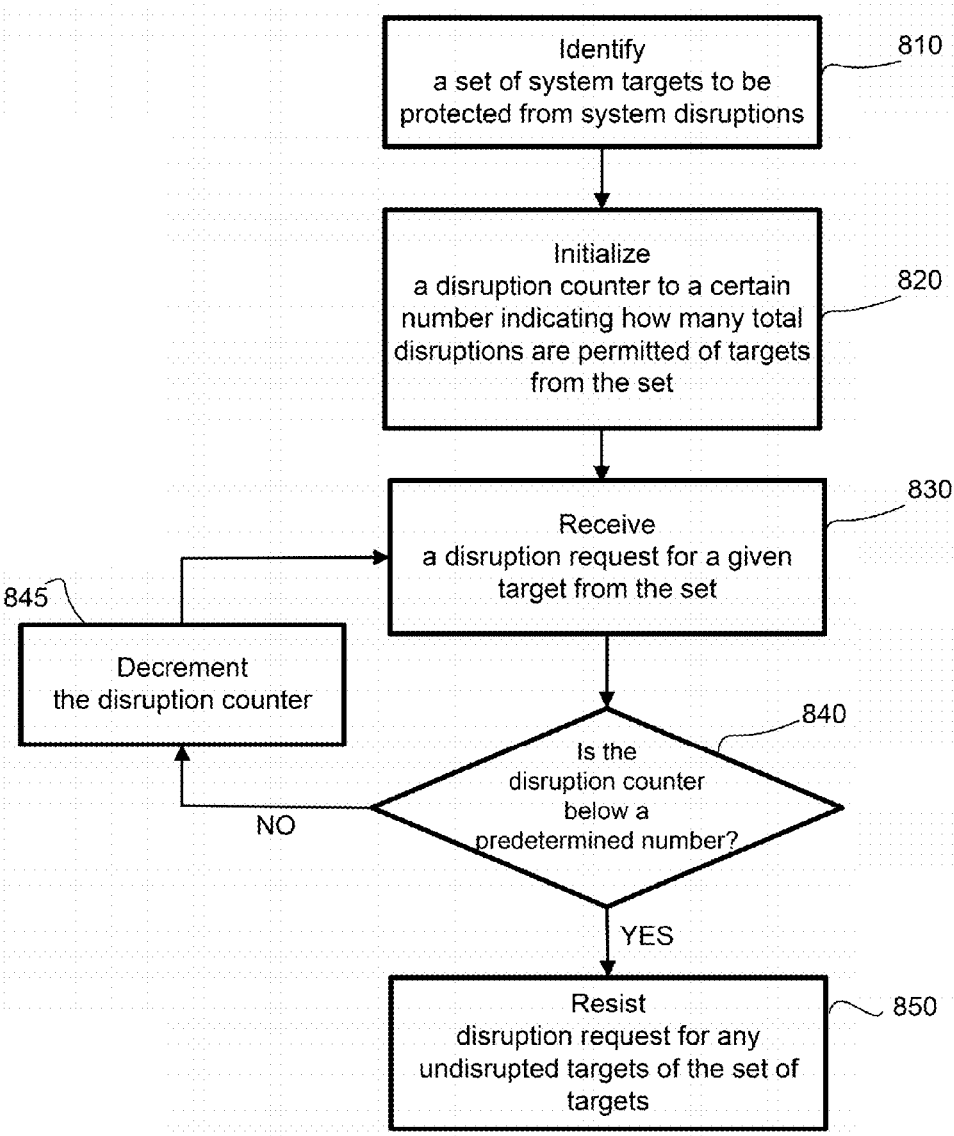
FIG. 8 depicts an example of a method according to aspects of the disclosure.

FIG. 8 is an example of a method 800, which may employ one or more disruption counters as described herein. At block 810, a set of system targets to be protected from system disruptions is identified. For example, the targets can be identified by a name of the target or by a reference or link to the target. In some aspects, the targets can be, e.g., jobs, tasks, programs, claims, data objects, resource pools, computing machines or various other system services and resources. Each target has a default effective precedence associated with disrupting the target.

At block 820, a disruption counter is initialized to a certain number indicating how many total disruptions are permitted of targets from the set. For example, the disruption counter may be initialized to a positive number. This number may be used to track of the number of targets from the set that can be concurrently disrupted. For example, based on the disruption of a given target in the set, the disruption counter is adjusted.

At block 830, a disruption request is received for a given target from the set. For example, the disruption request can be a planned or scheduled disruption for the given target. Based on this disruption request, the given target may be disrupted by transitioning from a functional to non-functional state.

At block 840, it can be determined whether the disruption counter is below a predetermined number. For example, this may indicate that the disruption counter has gone to a negative number. If the disruption counter is not below a predetermined number, method 800 proceeds to block 845. Otherwise, method 800 continues onto block 850.

At block 845, the disruption counter is decremented. For example, the disruption counter is decremented by one unit when a target in the set is disrupted based on the disruption request received at block 830. In this regard, for the disruption request to disrupt the target, it must have a precedence value greater than the effective precedence value for the given target.

At block 850, further disruptions for any targets from the set are resisted. For example, the disruption counter can resist disruptions that make things worse by increasing the effective precedence value for each undisrupted targets to correspond with a protection precedence value for the disruption counter.

While the examples above discuss decrementing the disruption counter in response to receiving disruption requests from an initialized value until a predetermined value, it should be understood that modifications may be made while still maintaining functionality of the counter. For example, the counter may be initialized to a value corresponding to a number of disruptions actually occurring, and count up to a predetermined value corresponding to the permitted number of disruptions. Once that value is reached or thereafter, targets may be protected from further disruptions.

The above-described aspects of the technology may be advantageous for protecting system targets from various disruptions. This may allow a system to manage the number of concurrent disruptions that may make the system miss a goal. By introducing techniques to track and resist certain system disruptions, the behavior of the system can be more predictable. Moreover, the various techniques and parameters disclosed within may be modified to further manage the behavior of the system.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended.

The invention claimed is:
1. A method, comprising:
   identifying, using one or more processors, a set comprising a plurality of system resource consumers, wherein each consumer is associated with and uses a system resource;

selecting a first value corresponding to a number of consumers from the set of consumers that are permitted to be concurrently disrupted;

determining, using the one or more processors, a second value related to a number of consumers that are concurrently disrupted;

receiving, by the one or more processors, a request to disrupt a consumer of the set of consumers;

determining whether to resist or permit the disruption request based on whether the number of consumers from the set of consumers that are permitted to be concurrently disrupted is greater than the number of consumers that are concurrently disrupted;

when the number of consumers from the set of consumers that are permitted to be concurrently disrupted is less than the number of consumers that are concurrently disrupted, resisting, using the one or more processors, the requested disruption; and when the number of consumers from the set of consumers that are permitted to be concurrently disrupted is greater than the number of consumers that are concurrently disrupted, permitting the disruption request, disrupting a consumer's use of its associated system resources and adjusting, using the one or more processors, the first value to reflect a decrement in the number of consumers from the set of consumers that are permitted to be concurrently disrupted.

2. The method of claim 1, further comprising adjusting the second value to reflect an increment to the number of consumers that are concurrently disrupted when permitting the disruption request.

3. The method of claim 1, further comprising permitting the disruption request when the second value is less than or equal to the first value.

4. The method of claim 1, wherein each consumer has a precedence value associated with disrupting the consumer.

5. The method of claim 4, wherein the disruption request includes a precedence value, further comprising:

determining, using the one or more processors, whether the precedence value of the disruption request exceeds the precedence value of the consumer; and permitting the disruption when it is determined that the precedence value of the disruption request exceeds the precedence value of the consumer.

6. The method of claim 1, further comprising adjusting at least one of the first value and the second value when a disrupted consumer in the set of consumers recovers from a disruption.

7. The method of claim 1, wherein each consumer has a weight, and further comprising adjusting at least one of the first value and the second value in proportion to the weight of a consumer when permitting the disruption request.

8. The method of claim 1, further comprising:

identifying a rate limit indicating a period of time in which no more than a predetermined number of disruptions can occur; and when the predetermined number of disruptions is met, resisting additional requested disruptions until the period of time has passed.

9. A non-transitory computer readable medium storing instructions that, when executed by one or more processors, cause the one or more processors to perform a method, the method comprising:

identifying a set of comprising a plurality of system resource consumers, wherein each consumer is associated with and uses a system resource;

selecting a first value corresponding to a number of consumers from the set of consumers that are permitted to be concurrently disrupted;

determining a second value related to a number of consumers that are concurrently disrupted;

receiving a request to disrupt a consumer of the set of consumers;

determining whether to resist or permit the disruption request based on whether the number of consumers from the set of consumers that are permitted to be concurrently disrupted is greater than the number of consumers that are concurrently disrupted;

when the number of consumers from the set of consumers that are permitted to be concurrently disrupted is less than the number of consumers that are concurrently disrupted, resisting the requested disruption; and when the number of consumers from the set of consumers that are permitted to be concurrently disrupted is greater than the number of consumers that are concurrently disrupted, permitting the disruption request, disrupting the consumer's use of it associated system resources and adjusting the first value to reflect a decrement in the number of consumers from the set of consumers that are permitted to be concurrently disrupted.

10. A system, comprising: a memory; and one or more processors in communication with the memory, the one or more processors being configured to:

identify a set comprising a plurality of system resource consumers, wherein each consumer is associated with and uses a system resource, select a first value corresponding to a number of consumers from the set of consumers that are permitted to be concurrently disrupted;

determine a second value related to a number of consumers that are concurrently disrupted;

receive a request to disrupt a consumer of the set of consumers;

determine whether to resist or permit the disruption request based on whether the number of consumers from the set of consumers that are permitted to be concurrently disrupted is greater than the number of consumers that are concurrently disrupted;

when the number of consumers from the set of consumers that are permitted to be concurrently disrupted is less than the number of consumers that are concurrently disrupted, resist the requested disruption; and when the number of consumers from the set of consumers that are permitted to be concurrently disrupted is greater than the number of consumers that are concurrently disrupted, permit the disruption request, disrupt a consumer's use of its associated system resources and adjust the first value to reflect a decrement in the number of consumers from the set of consumers that are permitted to be concurrently disrupted.

11. The system of claim 10, wherein the one or more processors are further configured to, when permitting the disruption request, adjust the second value to reflect an increment to the number of consumers that are concurrently disrupted.

12. The system of claim 10, wherein the disruption request is permitted when the second value is less than or equal to the first value.

13. The system of claim 10, wherein each consumer has a precedence value associated with disrupting the consumer.

14. The system of claim 13, wherein the disruption request includes a precedence value, and wherein the one or more processors are further configured to:
- determine whether the precedence value of the disruption request exceeds the precedence value of the consumer; and
- permitting the disruption when it is determined that the precedence value of the disruption request exceeds the precedence value of the consumer.

15. The system of claim 10, wherein the one or more processors are further configured to adjust at least one of the first value and the second value when a disrupted consumer in the set of consumers recovers from a disruption.

16. The system of claim 10, wherein each consumer has a weight, and wherein the one or more processors are further configured to adjust at least one of the first value and the second value in proportion to the weight of a consumer when permitting the disruption request.

* * * * *